(12) United States Patent
Sorge et al.

(10) Patent No.: US 9,938,933 B2
(45) Date of Patent: Apr. 10, 2018

(54) FUEL SYSTEM FOR A COMBUSTION ENGINE

(71) Applicant: GENERAL ELECTRIC COMPANY, Schenectady, NY (US)

(72) Inventors: Gregory Walter Sorge, Waukesha, WI (US); Michael Thomas Roll, Milwaukee, WI (US); Jerrold Arthur Pratt, Milwaukee, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 62 days.

(21) Appl. No.: 14/839,066

(22) Filed: Aug. 28, 2015

(65) Prior Publication Data

US 2017/0058838 A1 Mar. 2, 2017

(51) Int. Cl.
*F02M 21/02* (2006.01)
*F02M 21/04* (2006.01)
*F02B 43/00* (2006.01)

(52) U.S. Cl.
CPC ........ *F02M 21/04* (2013.01); *F02M 21/0212* (2013.01); *F02B 43/00* (2013.01); *F02M 21/02* (2013.01); *F02M 21/023* (2013.01); *F02M 21/0218* (2013.01); *F02M 21/0242* (2013.01); *Y02T 10/32* (2013.01); *Y02T 10/36* (2013.01)

(58) Field of Classification Search
CPC ........ F02M 21/02; F02M 21/028; F02M 2/23; F02M 21/0242; F02B 43/00
USPC ....................................................... 123/527
See application file for complete search history.

(56) References Cited

U.S. PATENT DOCUMENTS

| 3,783,849 A | | 1/1974 | Bramfitt | |
|---|---|---|---|---|
| 5,355,855 A | * | 10/1994 | Saikalis | ........... F02M 35/10386 123/438 |
| 5,377,646 A | * | 1/1995 | Chasteen | ............. F02M 21/042 123/527 |
| 5,699,767 A | * | 12/1997 | Notsu | ....................... F02D 9/06 123/27 GE |
| 7,627,416 B2 | | 12/2009 | Batenburg et al. | |

(Continued)

OTHER PUBLICATIONS

Application Notes; Waukesha Engine, Dresser, Inc.; No. WED9/97 Rev. 1; pp. 1-2.

(Continued)

*Primary Examiner* — Jacob Amick
*Assistant Examiner* — Charles Brauch
(74) *Attorney, Agent, or Firm* — Fletcher Yoder, P.C.

(57) ABSTRACT

A fuel system includes an air and fuel mixer configured to mix air and fuel provided to a combustion engine and a fuel path coupled to the air and fuel mixer. The fuel path includes an electronically controlled fuel control valve configured to regulate an air to fuel ratio of an air/fuel mixture provided to the engine, a gas pressure regulator disposed upstream of the fuel control valve and configured to control a pressure of the fuel in relation to an air pressure of the air and fuel mixer, and a manual adjust valve disposed downstream of the gas pressure regulator and configured to mechanically tune a performance of the fuel path to minimize an adjustment by the electronically controlled fuel control valve to regulate the air to fuel ratio. The fuel system is configured to operate with different fuels that differ in physical and chemical properties.

19 Claims, 3 Drawing Sheets

(56) References Cited

U.S. PATENT DOCUMENTS

| | | | |
|---|---|---|---|
| 2011/0088655 A1* | 4/2011 | Ancimer | F02D 41/0027 123/299 |
| 2011/0100335 A1* | 5/2011 | Parlatore | F02B 43/10 123/511 |
| 2012/0125299 A1* | 5/2012 | Yang | F02M 21/04 123/527 |
| 2013/0068205 A1* | 3/2013 | Veerathappa | F01M 3/00 123/73 PP |

OTHER PUBLICATIONS

IMPCO Technologies "Large Engine Catalog", Jun. 2007, pp. 1-132.
Application Note 36719; L-Series Air-Fuel Ratio Controller Configuration Instructions for Bi-Fuel Applications; 2008; pp. 1-26.
U.S. Appl. No. 14/796,768, filed Jul. 10, 2015, Sorge et al.

* cited by examiner

FUEL SYSTEM FOR A COMBUSTION ENGINE

BACKGROUND

The subject matter disclosed herein relates to combustion engines, and more specifically, to fuel systems for combustion engines.

Combustion engines typically combust a carbonaceous fuel, such as natural gas, gasoline, diesel, and the like, and use the corresponding expansion of high temperature and pressure gases to apply a force to certain components of the engine, e.g., piston disposed in a cylinder, to move the components over a distance. Accordingly, the carbonaceous fuel is transformed into mechanical motion, useful in driving a load. Sometimes combustion engines may be moved between and utilized in different sites. The different sites may include gases (e.g., field gases) having different properties (e.g., hydrocarbon composition, specific gravity, heating value, etc.). To accommodate the different gases, the combustion engines may require hardware changes upon moving to a different site that may result in having to certify the combustion engine for the gas (e.g., fuel) produced at the site.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In accordance with a first embodiment, a fuel system for a combustion engine is provided. The fuel system includes an air and fuel mixer configured to mix air and fuel provided to the combustion engine and a fuel path coupled to the air and fuel mixer. The fuel path includes an electronically controlled fuel control valve configured to regulate an air to fuel ratio of an air/fuel mixture provided to the combustion engine in response to control signals from a controller, a gas pressure regulator disposed upstream of the electronically controlled fuel control valve and configured to control a pressure of the fuel in relation to an air pressure of the air and fuel mixer, and a manual adjust valve disposed downstream of the gas pressure regulator and configured to mechanically tune a performance of the fuel path to minimize an adjustment by the electronically controlled fuel control valve to regulate the air to fuel ratio. The fuel system is configured to operate with different fuels that differ in physical and chemical properties.

In accordance with a second embodiment, a fuel system for a combustion engine is provided. The fuel system includes a carburetor configured to mix air and fuel provided to the combustion engine, wherein the carburetor includes a carburetor cone having a profile. The fuel system also includes a fuel path coupled to the carburetor. The fuel path includes an electronically controlled fuel control valve configured to regulate an air to fuel ratio of an air/fuel mixture provided to the combustion engine in response to control signals from a controller, a gas pressure regulator disposed upstream of the electronically controlled fuel control valve and configured to control a pressure of the fuel in relation to an air pressure of the carburetor, and a manual adjust valve disposed downstream of the gas pressure regulator and configured to mechanically tune a performance of the fuel path to minimize an adjustment by the electronically controlled fuel control valve to regulate the air to fuel ratio. The profile of the carburetor cone and regulation of the electronically controlled fuel control valve, the gas pressure regulator, and the manual adjust valve enable the fuel system to operate with different fuels that differ in physical and chemical properties.

In accordance with a third embodiment, a method is provided. The method includes beginning operation of a combustion engine utilizing an electronically controlled fuel control valve to regulate an air to fuel ratio of an air/fuel mixture provided to the combustion engine in response to control signals from a controller, wherein the electronically controlled fuel valve is disposed along a fuel path coupled to an air and fuel mixer of a combustion engine. The method also includes adjusting, subsequent to beginning operation of the combustion engine and prior to the combustion engine reaching full speed, a pressure of a fuel within the fuel path based on the physical and chemical properties of the fuel via adjustment of a gas pressure regulator disposed along the fuel path upstream of the electronically controlled fuel control valve. The method further includes, subsequent to adjusting the pressure of the fuel while the combustion engine approaches full speed, mechanically tuning a performance of the fuel path to minimize an adjustment by the electronically controlled valve to regulate the air to fuel ratio by adjusting a position of a manual adjust valve disposed along the fuel path disposed downstream of the gas pressure regulator.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
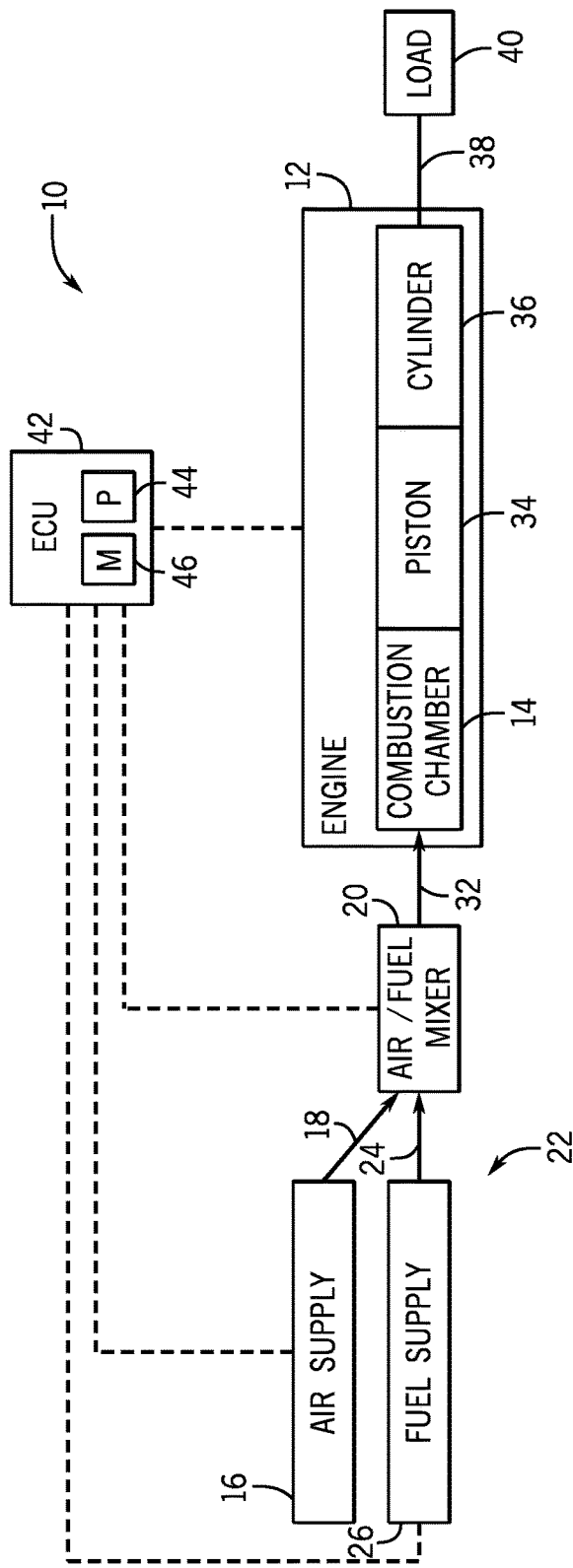
FIG. 1 is a block diagram of an embodiment of a portion of an engine driven power generation system having a fuel system in accordance with aspects of the present disclosure.

One or more specific embodiments of the present subject matter will be described below. In an effort to provide a concise description of these embodiments, all features of an actual implementation may not be described in the specification. It should be appreciated that in the development of any such actual implementation, as in any engineering project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems and methods for providing a fuel system for a combustion engine (e.g., a spark-ignited gaseous fuel internal combustion engine) that can be utilized with a wide range of different fuels having different physical and chemical properties (e.g., chemical heat content, specific gravity, hydrocarbon composition, etc.) with a combustion engine (e.g., a spark-ignited gaseous fuel internal combustion engine). The fuel system includes an air and fuel mixer (e.g., carburetor) that mixes air and fuel provided to the combustion engine. The fuel system also includes a fuel path for a fuel (e.g., gaseous fuel such as natural gas from a natural gas field) coupled to the air and fuel mixer. In certain embodiments, the fuel path includes an electronically controlled fuel control valve (e.g., fuel control valve) that regulates (e.g., maintains) the air to fuel ratio (or lambda ($\lambda$) or equivalence ratio, i.e., ratio of actual AFR to stoichiometric AFR) of an air/fuel mixture provided to the combustion engine in response to control signals from a controller. The AFR is the mass ratio of air to fuel. The fuel path may include a gas pressure regulator (e.g., located upstream of the electronically controlled fuel control valve) to control a pressure of the fuel in the fuel path. The fuel system may also include a manual adjust valve to mechanically tune a performance of the fuel path to minimize an amount of adjustment by the electronically controlled fuel control valve to regulate (e.g., maintain) the air to fuel ratio. A controller may be coupled to the combustion engine and/or components of the fuel system (e.g., air and fuel mixer, electronically controlled fuel control valve, air and fuel control valve (e.g., throttle valve), etc.). The controller may be programmed to change the set AFR utilized by the electronically controlled fuel control valve based on the different physical and chemical properties of the fuel to be utilized. The air and fuel mixer may include a gas valve or gas metering valve (e.g., carburetor cone) having a specific geometry or profile that enables the gas valve to be utilized with a range of different fuels having different physical and chemical properties. Also, the gas valve's geometry and profile enables the gas valve to be utilized over a wide range of AFRs (e.g., up to a 16 to 1 AFR). The geometry of the gas valve in conjunction with the gas pressure regulator, electronically controlled fuel control valve, and manual adjust valve enables the combustion engine to be utilized with different fuels having different physical and chemical properties (e.g., from different sites such as natural gas field sites). For example, the fuel system and combustion engine may be utilized with different fuels having a heating value range and/or specific gravity range spanning from a low limit (e.g., lower end or lower threshold) to an upper limit (e.g. upper end or threshold) and the ratio of the upper limit to the lower limit is 3 to 1. The disclosed embodiments enable the combustion engine and associated fuel system to be utilized at different sites with different fuels for a wide variety of applications without having to change any hardware on the fuel system. Thus, a combustion engine and associated fuel system may be certified a single time (e.g., U.S. EPA Mobile certification) for utilization at the different sites. In addition, the disclosed embodiments save costs associated with hardware changes and stocking multiple certified engines for specific fuels.

Turning to the drawings, FIG. 1 illustrates a block diagram of an embodiment of a portion of an engine driven power generation system 10. As described in detail below, the system 10 includes an engine 12 having one or more combustion chambers 14 (e.g., 1, 2, 3, 4, 5, 6, 7, 8, 10, 12, 14, 16, 18, 20, or more combustion chambers 14). The engine 12 may include a reciprocating or piston engine (e.g., internal combustion engine). The engine 12 may include a spark-ignition engine. An air supply 16 is configured to provide a pressurized oxidant 18, such as air, oxygen, oxygen-enriched air, oxygen-reduced air, or any combination thereof, to each combustion chamber 14 via an air and fuel mixer 20 (e.g., carburetor). The combustion chamber 14 is also configured to receive, via a fuel system 22, a fuel 24 (e.g., a gaseous fuel such as unprocessed field gas from a natural gas field) from a fuel supply 26. The fuel system 22 is configured to operate with different fuels having different physical and chemical properties (e.g., pure methane versus pure propane). For example, the fuels may include different chemical heat contents, specific gravities, hydrocarbon compositions, and/or other properties. For example, the fuel system 22 may operate with different fuels having a heating value range and/or specific gravity range spanning from a low limit (e.g., lower end or lower threshold) to an upper limit (e.g. upper end or threshold) and the ratio of the upper limit to the lower limit is 3 to 1. A fuel-air mixture 32 ignites and combusts within each combustion chamber 14. The hot pressurized combustion gases cause a piston 34 adjacent to each combustion chamber 14 to move linearly within a cylinder 36 and convert pressure exerted by the gases into a rotating motion, which causes a shaft 38 to rotate. Further, the shaft 38 may be coupled to a load 40, which is powered via rotation of the shaft 38. For example, the load 40 may be any suitable device that may generate power via the rotational output of the system 10, such as an electrical generator. Additionally, although the following discussion refers to air as the oxidant 16, any suitable oxidant may be used with the disclosed embodiments. Similarly, the fuel 24 may be any suitable gaseous fuel, such as natural gas, associated petroleum gas, propane, biogas, sewage gas, landfill gas, coal mine gas, for example.

The system 10 disclosed herein may be adapted for use in stationary applications (e.g., in industrial power generating engines) or in mobile applications (e.g., in cars or aircraft). The engine 12 may be a two-stroke engine, three-stroke engine, four-stroke engine, five-stroke engine, or six-stroke engine. The engine 12 may also include any number of combustion chambers 14, pistons 34, and associated cylinders (e.g., 1-24). For example, in certain embodiments, the system 10 may include a large-scale industrial reciprocating engine having 4, 6, 8, 10, 16, 24 or more pistons 34 reciprocating in cylinders 36. In some such cases, the cylinders 36 and/or the pistons 34 may have a diameter of between approximately 13.5-34 centimeters (cm). In some embodiments, the cylinders 36 and/or the pistons 34 may have a diameter of between approximately 10-40 cm, 15-25 cm, or about 15 cm. The system 10 may generate power ranging from 10 kW to 10 MW. In some embodiments, the engine 12 may operate at less than approximately 1800 revolutions per minute (RPM). In some embodiments, the engine 12 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 12 may operate between approximately 750-2000 RPM, 900-1800 RPM, or 1000-1600 RPM. In some embodiments, the engine 12 may operate at approximately 1800 RPM, 1500 RPM, 1200

RPM, 1000 RPM, or 900 RPM. Exemplary engines 12 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The fuel system 22 includes an electronically controlled fuel control valve configured to regulate (e.g., maintain a desired or set AFR or lambda) the air to fuel ratio of the air/fuel mixture 32 provided to the engine 12 in response to control signals from a controller such as an engine control unit 42 (e.g., ECU). The engine driven power generation system 10 may include the ECU 42 coupled to the engine 12, different components of the fuel system 22 (e.g., air and fuel mixer 20, electronically controlled fuel control valve, fuel and fuel control valve (e.g., throttle valve) in the air and fuel mixer 20, etc.), and one or more sensors disposed throughout the system 10 (e.g., sensor in the air and fuel mixer 20 to measure air pressure). In certain embodiments, the components of the fuel system 22 may be coupled to one or more controllers separate from the ECU 42 or both the ECU 42 and the one or more controllers. The ECU 42 controls engine operations as well as may be programmed to change the set AFR utilized by the electronically controlled fuel control valve for a wide range of different fuels utilized by the engine 12. The ECU 42 when changing between different fuels may also change engine ignition timing and desired AFR to an appropriate engine ignition timing and an appropriate desired AFR for the specific fuel oncoming to the engine 12. Components of the fuel system 22 may act together to enable the electronically controlled valve to remain within a control range for both engine operating speeds and loads for a wide range of different fuels that the engine 12 may operate with.

The ECU 42 includes a processor 44 and a memory 46 (e.g., machine-readable medium). The ECU 42 may include the processor 44 or multiple processors. The processor 44 may include multiple microprocessors, one or more "general-purpose" microprocessors, one or more special-purpose microprocessors, and/or one or more application specific integrated circuits (ASICS), system-on-chip (SoC) device, or some other processor configuration. For example, the processor 44 may include one or more reduced instruction set (RISC) processors or complex instruction set (CISC) processors. The processor 44 may execute instructions or non-transitory code. These instructions may be encoded in programs or code stored in a tangible non-transitory computer-readable medium, such as the memory 46 and/or other storage. The memory 46, in the embodiment, includes a computer readable medium, such as, without limitation, a hard disk drive, a solid state drive, diskette, flash drive, a compact disc, a digital video disc, random access memory (RAM and/or flash RAM), and/or any suitable storage device that enables the processor 44 to store, retrieve, and/or execute instructions (e.g., software or firmware) and/or data (e.g., thresholds, ranges, etc.). The memory 46 may include one or more local and/or remote storage devices.

Figure 2:
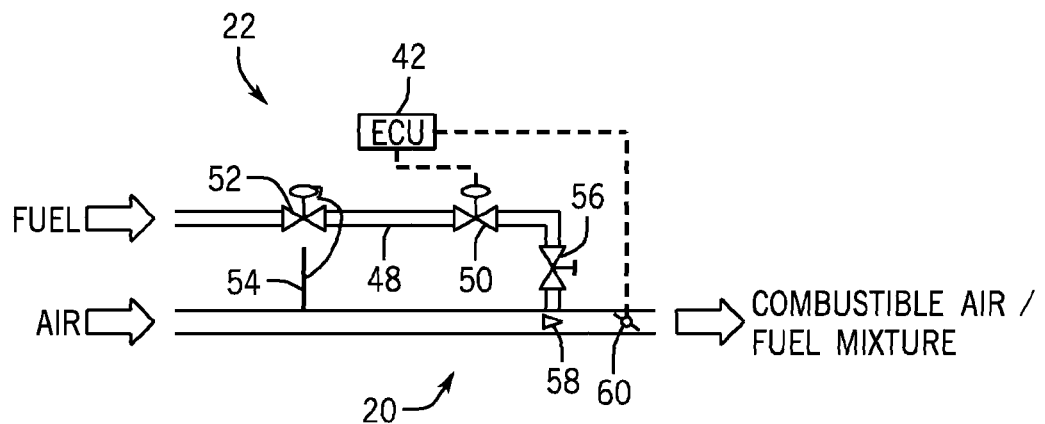
FIG. 2 is a schematic diagram of an embodiment of a fuel system in accordance with aspects of the present disclosure.

FIG. 2 illustrates a schematic diagram of an embodiment of the fuel system 22. The fuel system 22 may be coupled to the engine 12 described in FIG. 1. The fuel system 22 includes the air and fuel mixer 20 (e.g., carburetor) coupled to a fuel path 48. The fuel system 22 is configured to operate with different fuels having different physical and chemical properties (e.g., pure methane versus pure propane). For example, the fuels may include different chemical heat contents, specific gravities, hydrocarbon compositions, and/or other properties. For example, the fuel system 22 may operate with different fuels having a heating value range and/or specific gravity range spanning from a low limit (e.g., lower end or lower threshold) to an upper limit (e.g. upper end or threshold) and the ratio of the upper limit to the lower limit is 3 to 1. For example, the heating value range for the different fuels may be between approximately 850 Btu/scf (7.5 cal(IT)/cm$^3$) and 2350 Btu/scf (20.9 cal(IT)/cm$^3$).

As depicted, the fuel system 22 includes an electronically controlled fuel control valve 50 disposed along the fuel path 48. The electronically controlled fuel control valve 50 may be located upstream of the air and fuel mixer 20. The electronically controlled fuel control valve 50 in response to control signals from the ECU 42 regulates (e.g., maintains) a desired AFR or lambda of an air/fuel mixture (e.g., for a wide range of fuels having different physical and chemical properties) provided to the engine 12.

The fuel system 22 also includes a gas pressure regulator 52 (e.g., gas pressure regulator valve) disposed along the fuel path 48 that controls or regulates the pressure of the fuel in relation to an air pressure of the air and fuel mixer 20. For example, the gas pressure regulator 52 may be coupled to a sensor or transducer 54 that measures a pressure of the air entering the air and fuel mixer 20. The pressure of the fuel entering the air and fuel mixer 20 has a significant effect on the AFR when the engine 12 is starting, idling, or running under light loads. Adjustments to the gas pressure regulator 52 occur during, idling, or running under light loads prior to any adjustments to a manual adjust valve 56. The gas pressure regulator 52 is disposed along the fuel path 48 upstream of both the air and fuel mixer 20 and the electronically controlled fuel control valve 50.

The fuel system 22 also includes the manual adjust valve 56 disposed along the fuel path 48 that mechanically tunes the performance of the fuel path 48 to minimize an amount of adjustment by the electronically controlled valve 50 to regulate (e.g., maintain) the AFR. The manual adjust valve 56 (i.e., a position) is adjusted as the engine 12 approaches or nears full power (i.e., rated speed under full load). Although the manual adjust valve 56 is depicted in FIG. 2 downstream of the electronically controlled valve 50, the manual adjust valve 56 may be disposed along the fuel path 48 upstream or downstream of the electronically controlled valve 50 but downstream of the gas pressure regulator 52. In certain embodiments, the manual adjust valve 56 may be part of the air and fuel mixer 20 (e.g., upstream of mixing valve 58 where it can be adjusted to restrict gas flow upstream of the mixing valve 58). The gas pressure regulator 52 is disposed along the fuel path 48 between the air and fuel mixer 20 and the electronically controlled fuel control valve 50. The gas pressure regulator 52 and the manual adjust valve 56, acting together, enable the electronically controlled valve 50 to remain within a control range for both engine operating speeds and loads for a wide range of different fuels that the engine 12 may operate with.

As depicted, the air and fuel mixer 20 (e.g., carburetor) includes a mixing valve 58 (e.g., air and gas valve mixer) and an air and fuel control or load control valve 60 (e.g., throttle valve) located downstream of the mixing valve 58. The air and fuel control valve 60 controls the amount of fluid (i.e., combustible air/fuel mixture) provided to the engine 12 affecting the load or power of the engine 12. The air and fuel control valve 60 is coupled to the ECU which provides control signals to actuate the valve 60 (e.g., via an actuator) and changes positions of the valve 60. The mixing valve 58 mixes the air and the fuel (e.g., fuel path 48) received by the air and fuel mixer 20. The mixing valve 58 includes a gas valve or gas-metering valve (e.g., carburetor cone). The shape of the gas valve is configured to maintain the correct AFR over the entire operating range of the engine 12. As discussed in greater detail below, the gas valve is shaped (i.e., has a profile) that enables the gas valve to be utilized with a wide range of different fuels having different physical and chemical properties as described above. The gas valve enables the air and fuel mixer 20 to operate up to an AFR of 16 to 1. The gas valve also enables the air and fuel mixer 20 to operate with fuel and air pressures between 0 and 12 inches water column (2.99 kPa). In addition, the gas valve further enables the air and fuel mixer 20 to operate from an approximately 10 percent engine load to 100 percent engine load for the wide range of different fuels.

In adjusting the settings for the fuel system 22 in response to utilizing a different fuel. The ECU 42 changes and/or sets the desired AFR based on the specific fuel to be utilized with the engine 12. During startup or the beginning of engine operation, the electronically controlled valve 50 is controlled to desired AFR by the ECU 42 to regulate the AFR of the air/fuel mixture provided to the combustion engine 12. Subsequent to beginning operation of the combustion engine 12 and prior to the combustion engine reaching full speed, a pressure of the fuel within the fuel path 48 is adjusted based on the physical and chemical properties of the fuel via adjustment of the gas pressure regulator 52. Subsequent to adjusting the pressure of the fuel and while the combustion engine 12 approaches or nears full speed, a position of the manual adjustment valve 56 is tracked and adjusted to mechanically tune the performance of the fuel path 22 to minimize an adjustment by the electronically controlled fuel control valve 50 to regulate the AFR. Together the shape of the gas valve and regulation of the electronically controlled fuel control valve 50, the gas pressure regulator 52, and the manual adjust valve 56 enable the fuel system 22 to operate with different fuels that differ in physical and chemical properties. Thus, the combustion engine 12 and associated fuel system 22 may be utilized at different sites with different fuels for a wide variety of applications without having to change any hardware on the fuel system 22. Also, the combustion engine 12 and associated fuel system 22 may be certified a single time (e.g., U.S. EPA Mobile certification) for utilization at the different sites. Thus, saving costs associated with hardware changes and stocking multiple certified engines for specific fuels.

Figure 3:
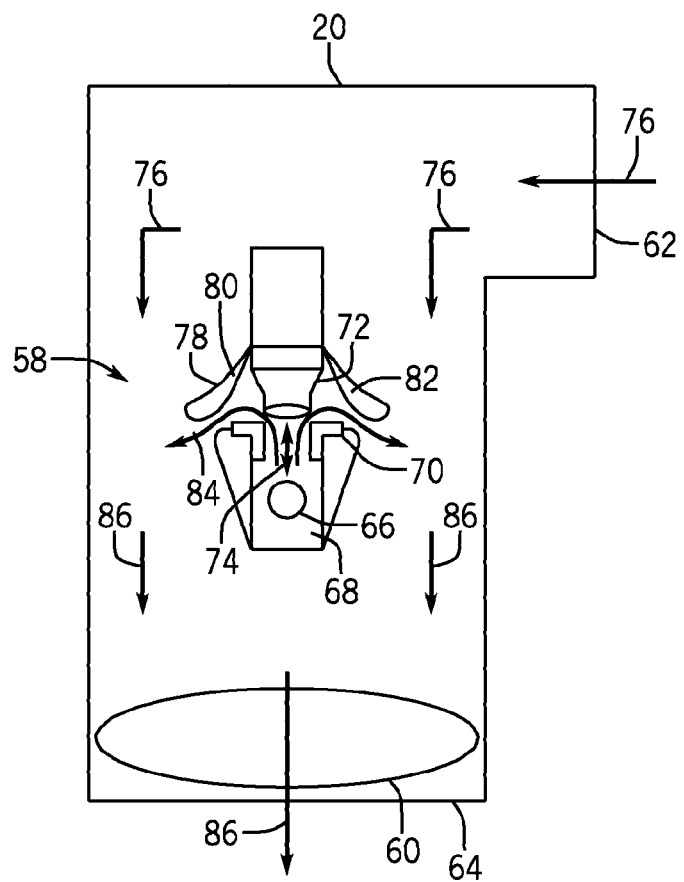
FIG. 3 is a schematic diagram of an embodiment of an air and fuel mixer (e.g., carburetor) in accordance with aspects of the present disclosure.

FIG. 3 is a schematic diagram of an embodiment of an air and fuel mixer 20 (e.g., carburetor). The air and fuel mixer 20 includes an air inlet 62 configured to receive air and an air/fuel mixture outlet 64 to discharge an air/fuel mixture to the combustion engine 12. The air and fuel mixer 20 also includes the mixing valve 58 (e.g., air and gas valve mixer) located upstream or above the air and fuel control or load control valve 60 (e.g., throttle valve). The mixing valve 58 includes a fuel inlet 66 that provides fuel to a fuel chamber 68. The mixing valve 58 includes a jet 70 coupled to the fuel chamber 68 (which includes an inner diameter that forms a fuel outlet) and a gas valve or gas metering valve 72 (e.g., tapered gas valve or carburetor cone) that moves into and out of (as indicated by double arrow 74) of the inner diameter of the jet 70 to regulate how much fuel flows from the fuel chamber 68 and out of the mixing valve 58 into the air and fuel mixer 20. Thus, the gas valve 72 acts a restriction to fuel flow. The mixing valve 58 is configured to create a slight pressure drop (e.g., negative pressure) as air 76 is drawn into the air and fuel mixer 20 through the air inlet 62. A negative pressure signal is communicated to an upper side 78 of a diaphragm 80 through passages in the mixing valve 58, while atmospheric pressure acts on an under side 82 of the diaphragm to force it upward. An amount of negative pressure generated is determined by the position of the air and fuel control valve 60 and an amount of air flowing through the air and fuel mixer 20. As the diaphragm 80 rises (e.g., with valve 60 open), it lifts the gas valve 72 from the jet 70 or seat that enables fuel (as indicated by arrow 84) to exit out of the fuel chamber 68 and the mixing valve 58 to mix with the air 76 to form an air/fuel mixture 86 that exits via the outlet 64 to the engine 12.

The shape (e.g., geometry or profile) of the gas valve 72 or carburetor cone maintains the correct AFR over the entire operating range of the engine 12. The shape of the gas valve 72 is most important in the low flow (e.g., starting and light load) operating conditions. As discussed in greater detail below, the gas valve 72 is shaped (i.e., has a profile) to enable the gas valve 72 to be utilized with a wide range of different fuels having different physical and chemical properties as described above. The gas valve 72 enables the air and fuel mixer 20 to operate up to an AFR of 16 to 1. The gas valve 72 also enables the air and fuel mixer 20 to operate with fuel and air pressures between approximately 0 and 12 inches water column (2.99 kPa). In addition, the gas valve 72 further enables the air and fuel mixer 20 to operate from an approximately 10 percent engine load to 100 percent engine load for the wide range of different fuels.

Figure 4:
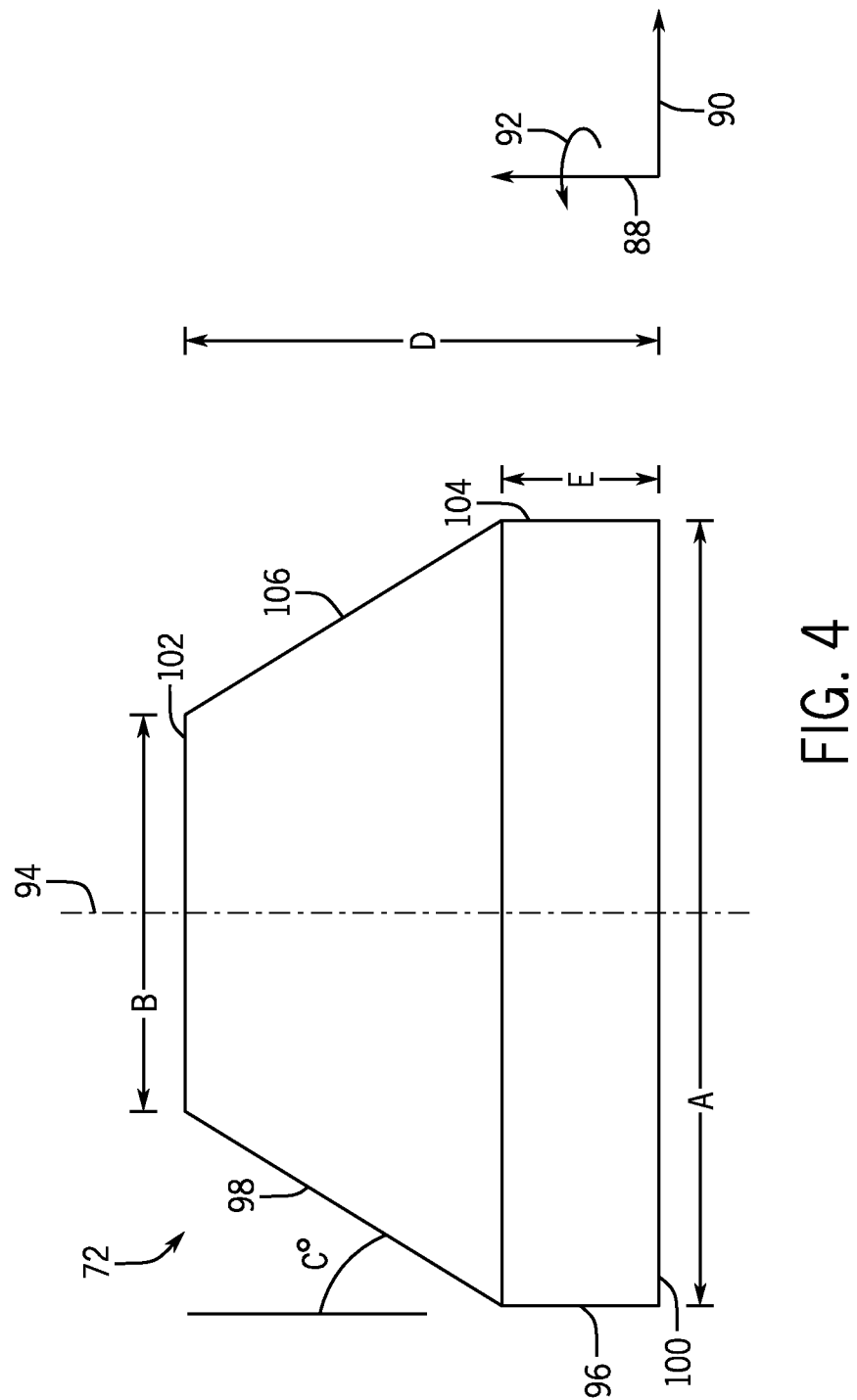
FIG. 4 is a side view of an embodiment of a gas valve (e.g., carburetor cone) of an air and fuel mixer (e.g., carburetor) in accordance with aspects of the present disclosure.

FIG. 4 is a side view of an embodiment of the gas valve 72 (e.g., carburetor cone) of the air and fuel mixer 20 (e.g., carburetor). In the following discussion, reference may be made to axial direction 88, a radial direction 90, and/or a circumferential direction 92 of the engine 12 defined relative to a central axis 94 of the gas valve 72. The gas valve 72 includes a base portion 96 (e.g., seat or annular base portion) and a conical portion 98 (e.g., annular conical portion). The gas valve 72 also includes a first end 100 at the base portion 96 and a second end 102 at a distal end (i.e., relative to the base portion 96) of the conical portion 98. The base portion 96 includes an annular wall 104 that defines a diameter, A, adjacent the first end 100. The conical portion 98 includes an annular, angled wall 106 extending between the base portion 96 and the second end 102. At the second end 102, the wall 106 defines a diameter, B. As depicted, a ratio of diameter A to diameter B may range from 2:1 to 3:1 and all subranges therebetween. The diameter A may be between approximately 2.7 and 3.2 cm. In certain embodiments, the diameter A may be approximately 3.175 cm. The diameter B may be between 1 and 1.4 cm. The angular wall 106 includes an angle, C°, which is constant along the wall 106 in the axial direction 88. The angle C° range between approximately 28 and 32 degrees and subranges therebetween. For example, the angle C° may be approximately 28, 29, 30, 31, or 32 degrees. The gas valve 72 includes a height or length, D, from the first end 100 to the second end 102 in the axial direction 88. The base portion 96 includes a height or length, E, in the axial direction 88. The diameter, A, of the base portion 96 may be constant along the height, E. The ratio of height, D, to the height, E, may range from 3.6:1 to 4.2:1 and all subranges therebetween.

Technical effects of the disclosed embodiments include providing the fuel system 22 for the combustion engine 12 that can be utilized with a wide range of different fuels having different physical and chemical properties (e.g., chemical heat content, specific gravity, hydrocarbon composition, etc.) with the combustion engine 12. The fuel system 22 may include the air and fuel mixer 22 that includes the gas valve 72 having a geometry or profile that enables it to be utilized over the wide range of different fuels. The fuel system 22 includes the path 48 that includes the gas pressure regulator 52, the electronically controlled fuel control valve 50, and the manual adjustment valve 56. Together the shape of the gas valve 72 and regulation of the electronically controlled fuel control valve 50, the gas pressure regulator 52, and the manual adjust valve 56 enable the fuel system 22 to operate with different fuels that differ in physical and chemical properties. Thus, the combustion engine 12 and associated fuel system 22 may be utilized at different sites with different fuels for a wide variety of applications without having to change any hardware on the fuel system 22. Also, the combustion engine 12 and associated fuel system 22 may be certified a single time (e.g., U.S. EPA Mobile certification) for utilization at the different sites. Thus, saving costs associated with hardware changes and stocking multiple certified engines for specific fuels.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A fuel system for a combustion engine, comprising:
an air and fuel mixer configured to mix air and fuel provided to the combustion engine; and
a fuel path coupled to the air and fuel mixer, wherein the fuel path comprises an electronically controlled fuel control valve configured to regulate an air to fuel ratio of an air/fuel mixture provided to the combustion engine in response to control signals from a controller, a gas pressure regulator disposed upstream of the electronically controlled fuel control valve and configured to control a pressure of the fuel in relation to an air pressure of the air and fuel mixer based on a measure of the air pressure of air entering the air and fuel mixer, and a manual adjust valve disposed downstream of the gas pressure regulator and configured to mechanically tune a performance of the fuel path to minimize an adjustment by the electronically controlled fuel control valve to regulate the air to fuel ratio, and wherein the air and fuel mixer comprises a mixing valve and a throttle valve, and the manual adjust valve is disposed upstream of both the mixing valve and the throttle valve;
wherein the fuel system is configured to operate with different fuels that differ in physical and chemical properties.

2. The fuel system of claim 1, wherein the different fuels have a heating value range spanning from a low limit of the heating value range to an upper limit of the heating value range and the ratio of the upper limit to the lower limit is 3 to 1.

3. The fuel system of claim 2, wherein the upper limit of the heating value range 20.9 cal(IT)/cm$^3$ and the lower limit of the heating value range is 7.5 cal(IT)/cm$^3$.

4. The fuel system of claim 1, wherein the different fuels have a specific gravity range spanning from a low limit of the specific gravity range to an upper limit of the specific gravity range and the ratio of the upper limit to the lower limit is 3 to 1.

5. The fuel system of claim 1, wherein the different fuels comprise at least pure propane and pure methane.

6. The fuel system of claim 1, wherein the air and fuel mixer comprises a gas valve having a geometry configured to enable the air and fuel mixer to operate up to an air to fuel ratio of 16 to 1.

7. The fuel system of claim 6, wherein the air and fuel mixer comprises a carburetor and the gas valve comprises a carburetor cone.

8. The fuel system of claim 7, wherein the carburetor cone comprises a base portion having a first height in a direction parallel to a central axis of the carburetor cone and a conical portion having a second height in the direction, and the ratio of the second height to the first height ranges between 3.6:1 to 4.2:1.

9. The fuel system of claim 8, wherein the conical portion comprises an angled wall having an angle between 28 and 32 degrees.

10. The fuel system of claim 1, wherein the air and fuel mixer is configured to operate from a 10 percent engine load to 100 percent engine load.

11. A fuel system for a combustion engine, comprising:
a carburetor configured to mix air and fuel provided to the combustion engine, wherein the carburetor comprises a carburetor cone having a profile; and
a fuel path coupled to the carburetor, wherein the fuel path comprises an electronically controlled fuel control valve configured to regulate an air to fuel ratio of an air/fuel mixture provided to the combustion engine in response to control signals from a controller, a gas pressure regulator disposed upstream of the electronically controlled fuel control valve and configured to control a pressure of the fuel in relation to an air pressure of the carburetor based on a measure of the air pressure of air entering in the carburetor, and a manual adjust valve disposed downstream of the gas pressure regulator and configured to mechanically tune a performance of the fuel path to minimize an adjustment by the electronically controlled fuel control valve to regulate the air to fuel ratio, and wherein the carburetor comprises a mixing valve and a throttle valve, and the manual adjust valve is disposed upstream of both the mixing valve and the throttle valve;
wherein the profile of the carburetor cone and regulation of the electronically controlled fuel control valve, the gas pressure regulator, and the manual adjust valve enable the fuel system to operate with different fuels that differ in physical and chemical properties.

12. The fuel system of claim 11, wherein the different fuels have a heating value range spanning from a low limit of the heating value range to an upper limit of the heating value range and the ratio of the upper limit to the lower limit is 3 to 1.

13. The fuel system of claim 12, wherein the upper limit of the heating value range 20.9 cal(IT)/cm$^3$ and the lower limit of the heating value range is 7.5 cal(IT)/cm$^3$.

14. The fuel system of claim 11, wherein the different fuels have a specific gravity range spanning from a low limit of the specific gravity range to an upper limit of the specific gravity range and the ratio of the upper limit to the lower limit is 3 to 1.

15. The fuel system of claim 11, wherein the different fuels comprise at least pure propane and pure methane.

16. The fuel system of claim 11, wherein the profile of the carburetor cone enables the carburetor to operate up to an air to fuel ratio of 16 to 1.

17. The fuel system of claim 11, wherein the carburetor cone comprises a base portion having a first height in a direction parallel to a central axis of the carburetor cone and a conical portion having a second height in the direction, and the ratio of the second height to the first height ranges between 3.6:1 to 4.2:1.

18. The fuel system of claim 17, wherein the conical portion comprises an angled wall having an angle between 28 and 32 degrees.

19. The fuel system of claim 11, wherein the carburetor cone enables the carburetor to operate with fuel and air pressures between 0 and 2.99 kPa.

\* \* \* \* \*